E. A. BARBET.
APPARATUS FOR REGULATING AND MAINTAINING A DESIRED LEVEL OF LIQUID IN EVAPORATING INSTALLATIONS.
APPLICATION FILED MAR. 26, 1917.

1,349,114.

Patented Aug. 10, 1920.
2 SHEETS—SHEET 1.

E. A. Barber
Inventor.

By Albert E. Parker
Attorney.

E. A. BARBET.
APPARATUS FOR REGULATING AND MAINTAINING A DESIRED LEVEL OF LIQUID IN EVAPORATING INSTALLATIONS.
APPLICATION FILED MAR. 26, 1917.

1,349,114.

Patented Aug. 10, 1920.
2 SHEETS—SHEET 2.

E. A. Barber.
Inventor.
By Albert E. Parker.
Attorney

UNITED STATES PATENT OFFICE.

EMILE AUGUSTIN BARBET, OF PARIS, FRANCE.

APPARATUS FOR REGULATING AND MAINTAINING A DESIRED LEVEL OF LIQUID IN EVAPORATING INSTALLATIONS.

1,349,114.   Specification of Letters Patent.   Patented Aug. 10, 1920.

Application filed March 26, 1917. Serial No. 157,579.

*To all whom it may concern:*

Be it known that I, EMILE AUGUSTIN BARBET, a citizen of the French Republic, residing at No. 5 Rue de l'Echelle, Paris, France, have invented certain new and useful Improvements in Apparatus for Regulating and Maintaining a Desired Level of Liquid in Evaporating Installations, of which the following is a specification.

In evaporating installations with vertical tubes it is well known that the hourly output of one and the same installation varies within rather considerable limits according to the height at which the level of the liquid is maintained in the evaporating tubes.

This best height can scarcely be determined except by the actual working of the evaporator because it is influenced by a large number of factors, among which are the diameter and the length of the tubes, the difference of temperature between the heating steam and the heated liquid, the activity of the circulation of the latter, the absolute pressure under which ebullition takes place, the viscosity of the liquid, its density, etc. It will therefore be understood that in a multiple-effect installation the evaporation boxes of the successive units or "effects" of which are generally of the same type, the best level to be maintained cannot be the same for all the evaporating boxes. Use alone will determine the said level, and further it will be advisable to be able to vary these respective levels according to the speed at which evaporation is to be effected in order to agree with that of the other installations in the factory.

In principle, in a continuous-operation installation, every kind of automatic regulation has its peculiar usefulness, but nevertheless care must be taken that the regulating apparatus does not exceed its proper duty or prevent the installation from being operated at the speed required at the moment. This want of flexibility in automatic regulating devices is what renders them sometimes undesirable and causes their use to be given up.

The invention hereinafter described has for its object to enable evaporating installations to give the maximum output of which they are capable at times when the remainder of the factory requires it, and to adjust them likewise at lower speeds of working when required, without thereby disturbing the system of relative temperatures of the boxes. This object is effected by the simple method of varying the levels.

This result is produced by providing a set of cocks arranged at different levels on the pipe for the return of the liquid. These cocks are connected on the other hand to a branch pipe which is in turn connected to a float-regulator for assuring the automatic exit of the liquid. This float-regulator is arranged outside the installation and can be readily inspected and repaired in case of any stoppage in its working.

This arrangement is also applicable with a few modifications to the evaporating boxes of existing types, more particularly of the Rilleux type.

The manner in which this invention is to be performed will now be more particularly described with reference to the accompanying drawings which illustrate by way of example two constructional forms of the invention.

In these drawings:—

Figure 1:
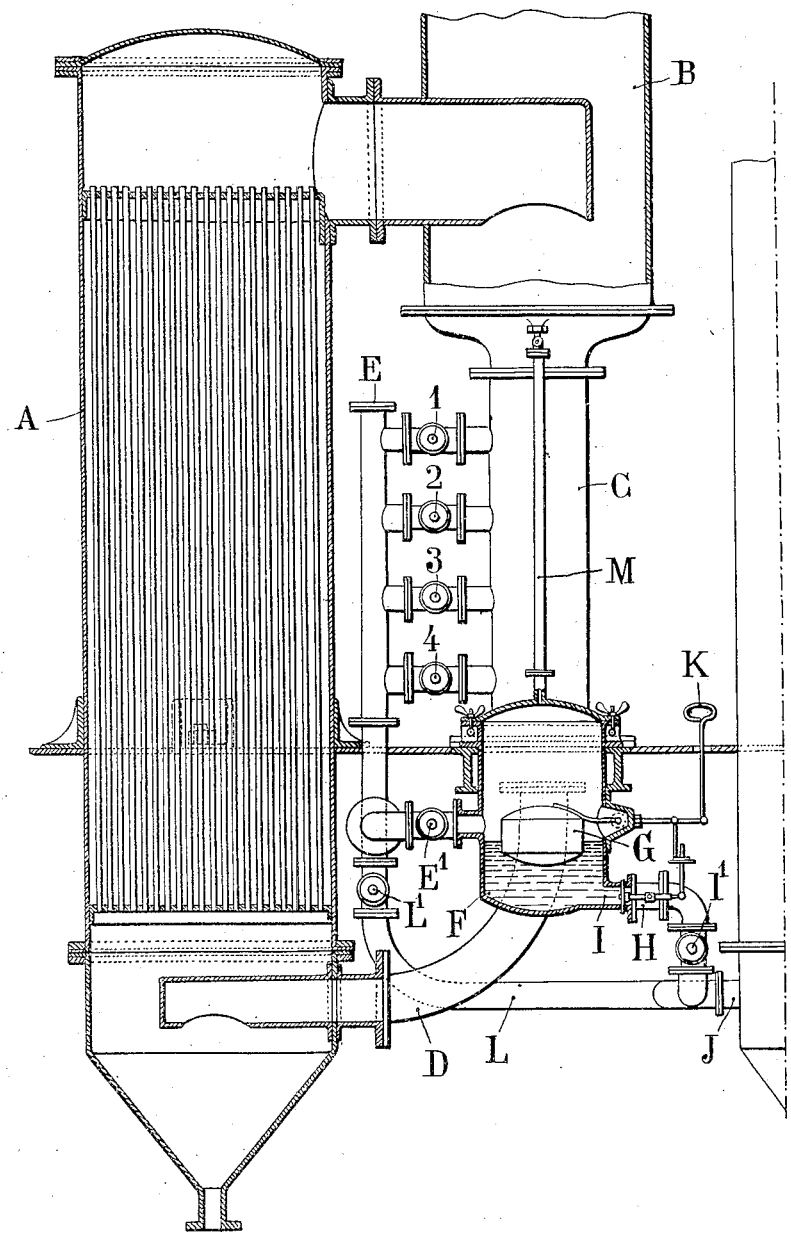
Figure 1 is an elevation partly in section of the improved regulating apparatus applied to an evaporating box with long vertical tubes.

As shown in Fig. 1, the separator connected to the evaporating box A comprises an upper chamber B into which the liquids flow from the box A.

This chamber B has an extension in the form of a cylinder C to the base of which there is fixed the return pipe D which returns the liquids to be concentrated to the lower part of the evaporating box A.

The cylinder C is provided with a plurality of cocks 1, 2, 3, 4, etc. (four cocks are shown in the drawing, but this number may be increased according to circumstances). These cocks are all connected to a common pipe E which delivers into a regulator provided with a float.

This regulator comprises a chamber F containing the float G which, through the medium of levers, operates the valve or throttle H situated in the exit pipe I provided at the lower part of the chamber F.

This pipe is connected at J to the lower portion of the evaporating box of the next following "effect."

A handled rod K fixed at the end of the lever of the float G allows of acting upon the latter and of ascertaining whether it is working properly.

In case it is not working, the regulator may be disconnected by means of the taps $E^1$ and $I^1$ and inspected.

The circulation of the liquid then takes place during the time required for repairs, by way of the pipe L which during normal working is closed by the cock $L^1$.

This arrangement allows of repairing the mechanism without stopping the whole installation and without having to allow the latter to cool. The result is that a considerable time is saved in case of accident to the said mechanism.

A small pipe M connects the upper part of the casing of the regulator to the part B of the separator so as to allow of freedom of movement of the regulator.

The operation of the apparatus will be readily understood.

On opening for instance the cock 4, the level in the separator C will be established at the height of the said cock, which will give to the cycle of the circulation a different speed from that which occurs when the level is higher.

The liquid flowing off through the cock 4 and the pipe E, enters the regulator F whose float regulates the exit of the liquid, by opening the throttle H more or less.

From the foregoing it will be readily understood that it is very easy to determine in practice at each box the evaporating power that corresponds to each of the level cocks, so that at any moment and according to the orders given him the operator will know which cock he is to open in order to suit requirements.

The same arrangement with slight modifications may be applied to existing evaporating installations of the Rilleux type, and also to other types.

Figure 2:
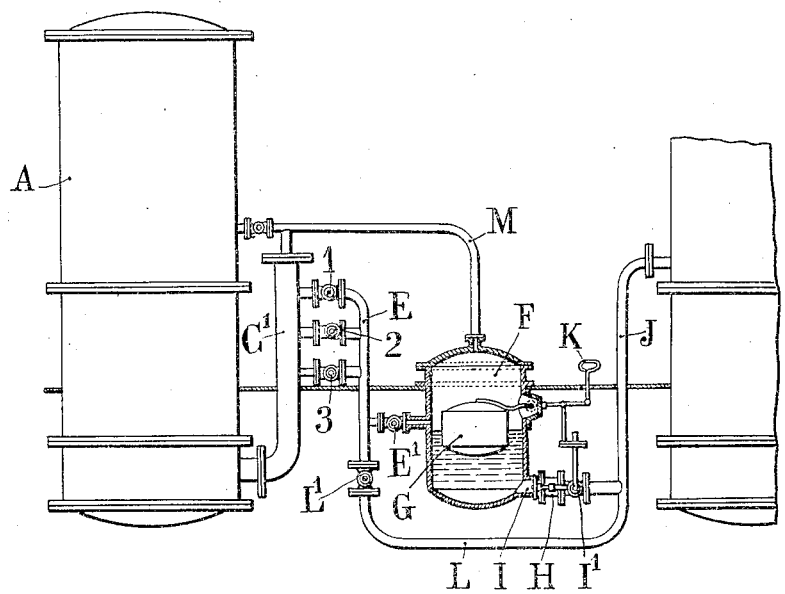
Fig. 2 shows the same apparatus applied to existing evaporating boxes.

Fig. 2 shows the scheme thereof which is self-explanatory; the same references being used to designate the same parts. Since the communicating vessel formed by the parts B, C, D (Fig. 1) is not provided in existing boxes, it is sufficient to connect to the outside of the apparatus the large pipe $C^1$ which is the equivalent for those parts.

What I claim is:—

1. Means for regulating the liquid level in tubular evaporating apparatus, comprising a tube connected with the evaporating vessel at a point below the lowest normal working level of the evaporating vessel and a plurality of valves connected to the tube at different heights, so that the level of the liquid in the tube and thus the level of liquid in the evaporating vessel will correspond with the height of the lowest of the aforesaid valves which is in the open position, a pipe adapted to receive the liquid discharged through all of said valves, and a float regulator connected to said pipe.

2. Means for regulating the liquid level in tubular evaporating apparatus, comprising a tube connected with the evaporating vessel at a point below the lowest normal working level of the evaporating vessel and a plurality of valves connected to the tube at different heights, so that the level of the liquid in the tube and thus the level of liquid in the evaporating vessel will correspond with the height of the lowest of the aforesaid valves which is in the open position, a pipe adapted to receive the liquid discharged through all of said valves, a float regulator to said pipe and means for cutting the float regulator out of the liquid discharge line.

3. A tubular evaporating apparatus comprising a tubular evaporating vessel, a tube connected with the evaporating vessel at a point below the lowest normal working level of the evaporating vessel and a plurality of valves connected to the tube at different heights, so that the level of the liquid in the tube and thus the level of liquid in the evaporating vessel will correspond with the height of the lowest of the aforesaid valves which is in the open position, a pipe adapted to receive the liquid discharged through all of said valves, and a float regulator connected to said pipe.

4. A tubular evaporating apparatus comprising a tubular evaporating vessel, a tube connected with the evaporating vessel at a point below the lowest normal working level of the evaporating vessel and a plurality of valves connected to the tube at different heights, so that the level of the liquid in the tube and thus the level of liquid in the evaporating vessel will correspond with the height of the lowest of the aforesaid valves which is in the open position, a pipe adapted to receive the liquid discharged through all of said valves, a float regulator to said pipe and means for cutting the float regulator out of the liquid discharge line.

In testimony whereof I have signed my name to this specification.

EMILE AUGUSTIN BARBET.

Witnesses:
  LUCIEN PAILLARD,
  CHAS. P. PRESSLY.